Sept. 10, 1940.          G. SIFKOVITZ                2,213,998
                        VALVE STRUCTURE
                   Original Filed Sept. 13, 1935
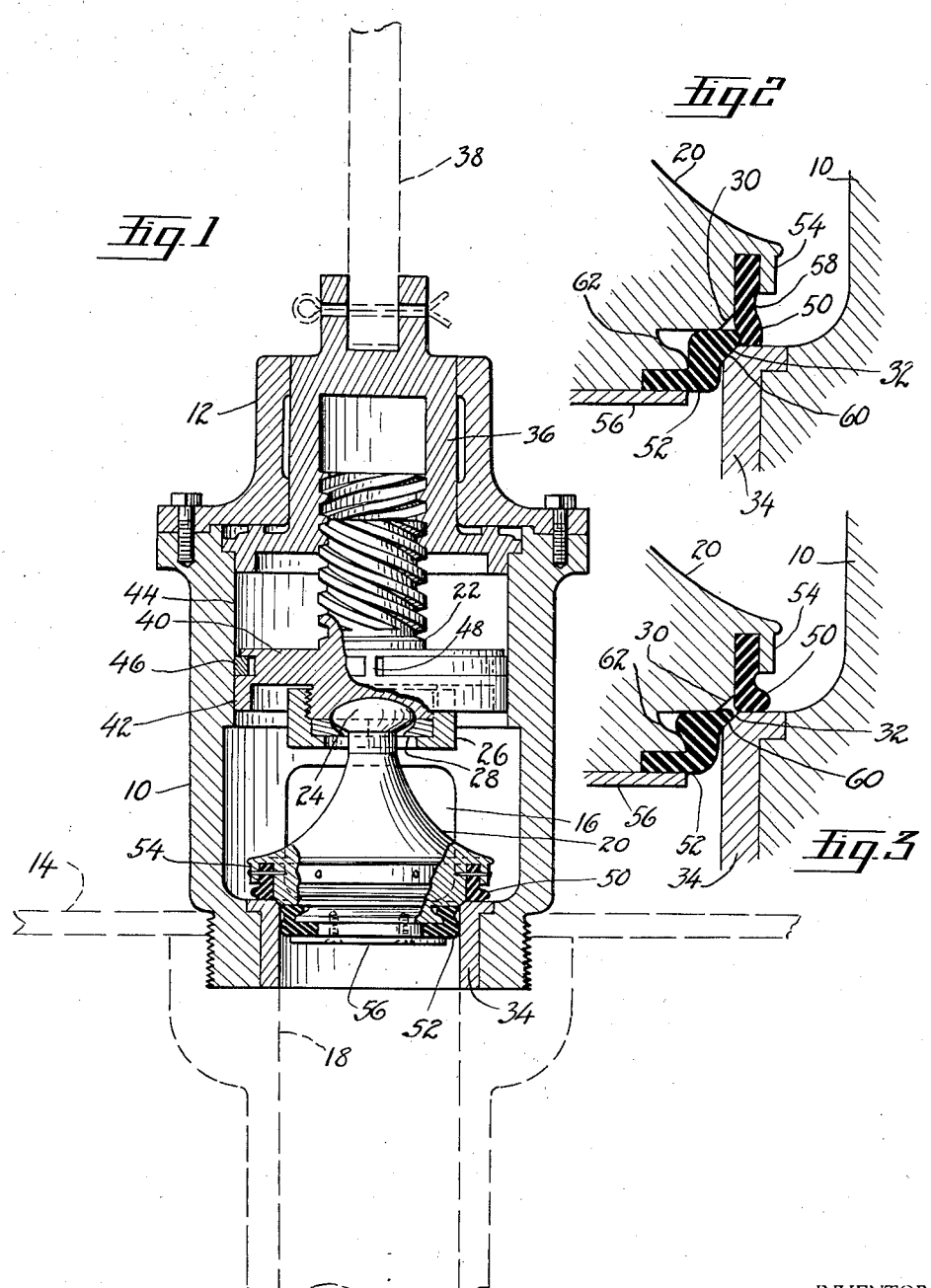
INVENTOR.
George Sifkovitz
BY Parker & Burton
ATTORNEYS.

Patented Sept. 10, 1940

2,213,998

UNITED STATES PATENT OFFICE 2,213,998

VALVE STRUCTURE

George Sifkovitz, Saegertown, Pa., assignor to The George Valve Company, Saegertown, Pa., a corporation of Delaware Original application September 13, 1935, Serial No. 40,377, now Patent No. 2,179,165, dated November 7, 1939. Divided and this application September 12, 1936, Serial No. 100,487

17 Claims. (Cl. 251—29)

An important object of the invention is to provide a novel construction for valve seats and valve closure members which acts to wipe and clean the valve engaging parts of all foreign matter, and to eject and keep away all foreign matter that might clog or freeze the valve. In many types of valves, such as the outlet valves of tanks, the presence of grit, sediment or scale is very likely to clog the valve seat, preventing proper closing, and it may freeze the valve in fixed position. It is the purpose of this invention to overcome these objectionable occurrences.

In accomplishing this result, this invention provides a novel arrangement of flexible elements, one element of which is adapted to contact the valve seat and as the valve head approaches the seat to wipe the seat clean of any scale or other foreign matter, and another element which is adapted to contact with the outer edge of the valve seat, and as the valve head advances upon the valve seat to flex or bend outwardly to thrust away all foreign matter from the presence of the valve seat and to form a shield around the valve seat protecting the same when the valve is closed.

Other objects, advantages, and meritorious features will appear more fully from the following specification, appended claims, and accompanying drawing, wherein:

Figure 1 is a vertical section through a valve structure illustrating the manner of cleaning the valve seating parts and keeping the valve free of foreign matter, Fig. 2 is a detail view showing another position of the valve in Fig. 1, and Fig. 3 is a detail view showing another position of the valve in Fig. 1.

The improved valve structure illustrated in the drawing forms divisional subject matter of my co-pending application Serial No. 40,377, filed Sept. 13, 1935, now Patent No. 2,179,165, granted Nov. 7, 1939. In the figures of the drawing, I show a valve construction protecting the valve closure members and which functions automatically to clean the valve seating parts in response to the closing and opening action of the valve. In addition to this feature, there is also shown a novel operating mechanism for imparting longitudinal movement to the valve head and a packless seal between relatively movable parts which permits movement of the operating parts while preventing any leakage. The valve is specially designed for an outlet valve, such as that provided in the bottom of tanks. It is to be understood, however, that the features incorporated therein are readily adaptable to other types of valves.

The valve comprises a valve body 10, having a cap 12 secured thereto. The valve shown therein is mounted upon the floor 14 of a tank or similar fluid supply. The inlet into the valve body is indicated at 16, and is on a level with the floor. A tubular outlet 18 is shown in dotted lines connected to the base of the valve body.

The valve operating parts comprise a valve head 20 rotatably and floatably attached to the end of the valve stem member 22, the closure thrust being received by the partial ball and socket swivel joint. This swivel joint comprises a ball end 24 on the valve head engageable in a concave socket on the base of the valve stem member. A collar or nut 26 is threaded to the valve stem member and supports a split washer 28 which completes the assembly of the joint. It is apparent from the inspection of the drawing, that the valve head 20 is free for rotation and slight angular movement relation to the stem member.

The valve head is provided with a valve seat 30, adapted to engage a fixed valve seat 32 and cut off the discharge of fluid through the outlet. The fixed valve seat may be formed on a bronze bushing 34 which fits the bore of the outlet.

The valve stem member 22 is thrust lengthwise through the valve body by a spiral thread between the stem member and the surrounding or cup-shaped member 36 having internal threads for this purpose. This last member extends through the cap 12 and is adapted to be rotated by any suitable means such as a crank arm 38. The valve stem member is provided with means for frictionally restraining it from rotation. This means comprises a shoulder 40 having a turned down edge 42 slidably contacting with a circular guideway 44 formed by the wall of the valve body. The shoulder is channeled to receive a split friction ring 46 which frictionally engages the guideway 44 and is adapted to be expanded into tighter engagement therewith by the action of the transverse channel wall 48 upon either end of the friction ring 40. Such action commences to take place when the valve stem member is rotated a slight distance in either direction.

As explained previously, this valve is provided with means which automatically functions upon operation of the valve to wipe the seat and form a protecting envelope therearound. This means comprises a pair of circular flexible elements or wipers 50 and 52 of approximately the same diameter as the contacting valve seating portions of the valve head and body. These elements may be composed of rubber is so desired. Where rubber may be damaged by the fluid intended to be used in the tank, synthetic rubber compositions or fibrous flexible material may be substituted. It is intended that these flexible elements be composed of material which will withstand the solution in which the valve is going to be used.

The flexible element 50 is secured by pins between an overhanging portion or wall 54 of the valve head and the main portion thereof. Flexible element 52 is secured to the base of the valve head by a retaining member or washer 56.

As clearly shown in the detail Figures 2 and 3, the flexible element 50 is cut away around its outer periphery at 58, just below the termination of the overhanging retaining wall 54. This assists the element in flexing outwardly as indicated in Fig. 3. The flexible element or wiper 52 has a radial flange or lip 60 adapted to overlie the valve seat 32 when the valve is in open position as shown in Fig. 2. The valve head is cut away inwardly of the wiper 52 as indicated at 62 so as to permit the wiper to retract inwardly away from the valve seat as shown in Fig. 3.

Figures 2 and 3 illustrate the purpose and operation of the flexible elements. In Fig. 2 the flexible elements are shown in the position they normally assume when the valve is in open position. In this figure, the elements are in normal position just before they commence their seat wiping and protecting action. Attention is directed to the cooperation existing between these elements. In normal position as shown in Fig. 2, they contact one another and form a housing completely enclosing the inclined face or seat 30 of the valve head. This seat is completely sheltered by these elements at all times except when the valve head is in close proximity to the valve seat 32.

In Fig. 3 the valve head has advanced approximately half as close to the valve seat, as in the position in Fig. 2. The elements 50 and 52 in the act of being flexed and compressed by increasingly greater engagement with the valve seats 30 and 32 and the surrounding surfaces. The inclined face of seat 30 is gradually being exposed as the elements separate from one another. The lip 60 is pinched between the valve seats 30 and 32 and slides over the faces of these seats as it retracts therefrom wiping them clean. Element 50 flexes outwardly as the valve head continues to advance and urges all foreign matter, such as scale, away from the valve seating parts and keeps this matter away during the sealing action of the valve head. In addition this flexible element serves to shut off the flow of fluid through the discharge opening of the valve prior to complete closure thereof and as a result prevents dripping of the valve. The position of the flexible elements at complete closure of the valve is shown in Fig. 1.

The valve illustrated in the drawing is particularly adaptable for oil and gasoline tanks on railway cars. The arrangement of the flexible elements is especially important in keeping the valve closing parts in clean and workable condition. The valves of oil tank cars are closed for the greater part of the time, and scale and other foreign matter is very likely to corrode the faces of the valve seats, and possibly freeze the valve in closed position. The flexible elements function both to clean the valve seating parts and to protect the same from contamination.

The swivel coupling is likewise important for outlet valves of this type. Many of the discharge outlets of tanks must be operated from the top of the tank, as for example, in the case of railroad tank cars. A long crank arm must be employed in the majority of tanks to react the outlet valve in the floor of the tank. These crank arms are likely to bend or flex under large turning forces applied thereto and this subjects the valves to unintended strains which, if a swivel joint of this type were not employed, would direct the valve level at an angle against the valve seat and prevent proper closure. The swivel joint allows the valve head to adjust itself and compensate for irregular valve operation.

The frictional release is also important in these types of valves. Large turning forces are applied to operate these valves, and if care is not taken, the valve will be operated with ruinous effect. By providing means for allowing the valve stem member to slip when overpowering forces are applied, further advancement of the valve head is discontinued and damage to the parts is prevented. The operator can tell by the additional resistance encountered that he is turning the split friction ring and ineffectively operating the valve. The swivel joint permits the valve head to remain stationary against the valve seat when the valve stem and other parts are rotated. This prevents injury to the valve seat and the surrounding flexible elements. The use of the flexible elements described herein is not limited to outlet valves, but may be employed on other types of valves as well if desired.

I claim:

1. A valve seat, a valve head supported to be advanced into seating engagement with said valve seat to cut off the flow of fluid through the valve and adapted to be withdrawn away from said seat, an element of flexible material carried by said valve head and adapted to contact the surface surrounding the valve seat prior to engagement of the valve head with the valve seat and further adapted upon continued movement of the valve head toward the valve seat to flex outwardly away from the seat wiping the surface surrounding the valve seat outwardly away from the seat and removing foreign material therefrom, a second element of flexible material carried by said valve head adapted to contact the valve seat prior to engagement thereof by said valve head and further adapted to wipe the valve seat upon continued movement of said valve head towards the valve seat.

2. In a valve, a valve seat, a valve head engageable with said seat to close the valve, said head provided with an element of flexible material adapted to contact the surface surrounding said valve seat and flex outwardly away from the seat upon continued movement of the head towards the seat, said valve head provided with a second element of flexible material adapted to contact said valve seat and wipe the same as the head advances towards the seat and just prior to engagement therewith.

3. In a valve, a valve seat, a valve member having a part engageable with said seat to close the valve, flexible means carried by said member and normally enclosing said part, said flexible means adapted to expose said part for engagement with said seat as the member approaches said seat.

4. In a valve, a valve seat, a valve member having a part engageable with said seat to close the valve, flexible means carried by said member and arranged to extend over said part to protect the same when the valve is open, said means adapted to be compressed between said part and said seat as the member approaches the latter and wipe the valve contacting parts prior to complete closure of the valve.

5. In combination with a pair of circular valve seating parts adapted to be separated from one another and brought into engagement with one another to open and close a valve respectively, a circular flexible element secured to one of said seating parts and arranged to be interposed between said parts as they are brought close together, said element adapted to be squeezed from between said parts as the seating parts are advanced closer together thereby wiping the seating parts prior to engagement.

6. In a valve, a valve seat, a valve member having a part engageable with the seat to close the valve, said member being movable to advance said part into engagement with the seat to close the valve or withdraw said part away from the seat to open the valve, a pair of flexible elements encircling said member on opposite sides of said part adapted to close together over said part when the valve is open, said elements adapted to be spread away from each other exposing said part for engagement with the seat upon closing of said valve.

7. In a valve, a valve seat, a valve member having a part engageable with the seat to close the valve, said member being movable to advance said part into engagement with the seat to close the valve or withdraw said part away from the seat to open the valve, a pair of flexible elements encircling said member on opposite sides of said part, said elements adapted to close together over said part when the valve is opened, said elements so arranged with respect to said part as to be squeezed away from each other to permit direct engagement of the part and the seat upon closing of said valve, one of said elements adapted to wipe across the valve seat as it is squeezed away from the other element upon closure of the valve.

8. In a valve, a valve seat, a valve member having a part engageable with the seat to close the valve, said member being movable to advance said part into engagement with the seat to close the valve or withdraw said part away from the seat to open the valve, a pair of flexible elements encircling said member on opposite sides of said part, said elements adapted to close together over said part when the valve is opened, said elements so arranged with respect to said part as to be squeezed away from each other to permit direct engagement of the part and the seat upon closing of said valve, said elements being resiliently compressible and adapted upon closing of the valve to be compressed between said valve member and the valve seat structure on opposite sides of that portion of the seat structure directly contacted by said part when the valve is closed.

9. In a valve, a valve seat, a member adapted to engage said seat to close the valve, an element of flexible material secured to said member and arranged to overlie the entire area of the valve seat as the member advances toward the seat and to be compressed against the seat and to wipe completely across the seat while in such compressed state upon continued advance of the member toward the seat and just prior to engagement of the member with the seat.

10. In a valve, a pair of valve seating members having surfaces adapted to contact one another to close the valve and to be separated from one another to open the valve, flexible means normally protectingly enclosing the contacting surface of one of said members, said flexible means adapted to be compressed and squeezed from between said surfaces as they are brought into engagement, said means wiping across the unprotected surface of the other member as it is squeezed from between said contacting surfaces.

11. In a valve, a pair of valve seating members having surfaces adapted to contact one another to close the valve and to be separated from one another to open the valve, flexible means normally protectingly enclosing the contacting surface of one of said members, said flexible means adapted in response to the closing movement of the valve to expose said contacting surface for engagement with the contacting surface of the other member and at the same time to wipe the unprotected contacting surface of said other member.

12. In a valve, a pair of valve seating members having surfaces adapted to contact one another to close the valve and to be separated from one another to open the valve, flexible means normally protectingly enclosing the contacting surface of one of said members, said flexible means adapted in response to the closing movement of the valve to expose said contacting surface for engagement with the contacting surface of the other member as the two surfaces are brought into engagement.

13. In a valve, a circular valve seating surface, a circular element of yieldable material adapted to overlie the entire area of said surface, and means for compressing said element against said surface and forcing the element to wipe radially across the entire area of the surface while in its compressed state.

14. In a valve having a valve seat and a member movable to engage the valve seat and close the valve, means in said valve operable in response to the valve closing movement of said member for preliminarily shutting off the flow of fluid over the valve seat before the member seats thereon, and means functioning in response to further movement of said member toward the valve seat to wipe the latter while the flow of fluid thereover is cut off by said first mentioned means.

15. In a valve, valve members having opposed surfaces adapted to be brought into contact to close the valve, and an element of more yieldable material than said contacting surfaces arranged to be interposed between the opposed surfaces and squeezed thereby as these surfaces approach one another, said element squeezing out from between said opposed surfaces as the members approach valve closing position and wiping the surfaces prior to contact.

16. In a valve, valve members having opposed surfaces adapted to be brought into contact to close the valve, and an element of more yielding material carried by one of said members, said element adapted to be interposed between said surfaces and squeezed therefrom as the surfaces are brought closer together in valve closing movement and thus wipe the surfaces prior to contact, one of said members being recessed adjacent said element to provide clearance for receiving the same as it is squeezed from between said surfaces.

17. In a valve, a member having a circular valve seating surface, a movable member having a circular surface adapted to engage said valve seat to close the valve, a ring-shaped element of flexible material having a diameter slightly larger than said engaging surfaces, means securing one end section of said element to said movable member coaxial with the surface thereof and having the opposite end section of the element projecting in advance of the circular surface on the movable member and free to flex laterally as it engages the member having the valve seat, said element provided with a groove in the outside surface thereof extending around the element and aiding the free end section thereof to flex outwardly as it engages the valve seating member.

GEORGE SIFKOVITZ.